United States Patent
Holung et al.

(10) Patent No.: US 10,152,094 B1
(45) Date of Patent: Dec. 11, 2018

(54) HINGE ASSEMBLY

(71) Applicant: Lenovo (Singapore) Pte. Ltd., Singapore (SG)

(72) Inventors: Joseph Anthony Holung, Wake Forest, NC (US); Michael Joseph Browne, Jr., Raleigh, NC (US); Matthew Ian Tucker, Durham, NC (US); Tin-Lup Wong, Chapel Hill, NC (US); Bouziane Yebka, Apex, NC (US); Ali Kathryn Ent, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/657,176

(22) Filed: Jul. 23, 2017

(51) Int. Cl.
*E05D 3/12* (2006.01)
*G06F 1/16* (2006.01)
*E05D 11/08* (2006.01)

(52) U.S. Cl.
CPC .......... *G06F 1/1681* (2013.01); *E05D 3/122* (2013.01); *G06F 1/1616* (2013.01); *G06F 1/1637* (2013.01); *G06F 1/1662* (2013.01); *E05D 11/082* (2013.01); *E05Y 2900/606* (2013.01)

(58) Field of Classification Search
None
See application file for complete search history.

(56) References Cited

U.S. PATENT DOCUMENTS

| | | | | |
|---|---|---|---|---|
| 7,832,056 B2* | 11/2010 | Kuwajima | ............ | H04M 1/022 16/282 |
| 9,127,490 B2* | 9/2015 | Chen | ................. | E05D 3/122 |
| 9,173,287 B1* | 10/2015 | Kim | .................. | H05K 1/028 |
| 9,477,261 B1* | 10/2016 | Rivera | ................. | G06F 1/1613 |
| 9,507,388 B1* | 11/2016 | Hampton | ............ | G06F 1/1618 |
| 9,677,308 B1* | 6/2017 | Chen | ................. | E05D 3/18 |
| 9,857,849 B1* | 1/2018 | Siddiqui | ............ | G06F 1/1681 |
| 2002/0024499 A1* | 2/2002 | Karidis | ................. | G06F 1/1616 345/156 |
| 2009/0070961 A1* | 3/2009 | Chung | .................. | E05D 3/122 16/354 |
| 2009/0279239 A1* | 11/2009 | Ha | ....................... | G06F 1/1616 361/679.11 |
| 2010/0024169 A1* | 2/2010 | Self | ........................ | A47K 3/36 16/354 |
| 2010/0232100 A1* | 9/2010 | Fukuma | ................. | F16G 13/18 361/679.01 |
| 2011/0157780 A1* | 6/2011 | Wang | .................... | G06F 1/1681 361/679.01 |
| 2013/0187525 A1* | 7/2013 | Chuang | ................ | G06F 1/1681 312/326 |
| 2013/0219663 A1* | 8/2013 | Cai | ....................... | G06F 1/1681 16/371 |
| 2013/0322004 A1* | 12/2013 | Park | ....................... | F16C 11/10 361/679.27 |

(Continued)

*Primary Examiner* — Xanthia C Cunningham
(74) *Attorney, Agent, or Firm* — Brian J. Pangrle

(57) ABSTRACT

A device can include a first housing that includes a first thickness; a second housing that comprises a second thickness; and a hinge assembly that couples the first and second housings where the hinge assembly includes two hollow axles operatively coupled to the second housing; a coupling mechanism that couples the two hollow axles; two axles, each received by a respective bore of one of the hollow axles, operatively coupled to the first housing; and a coupling mechanism that couples the two axles.

20 Claims, 8 Drawing Sheets

(56) References Cited

U.S. PATENT DOCUMENTS

| | | | |
|---|---|---|---|
| 2015/0101148 A1* | 4/2015 | Lee | G06F 1/1681 |
| | | | 16/319 |
| 2015/0189777 A1* | 7/2015 | Hsu | H05K 5/0226 |
| | | | 16/366 |
| 2015/0267450 A1* | 9/2015 | Chiang | G06F 1/1681 |
| | | | 16/354 |
| 2015/0277505 A1* | 10/2015 | Lim | G06F 1/1681 |
| | | | 361/679.27 |
| 2015/0305185 A1* | 10/2015 | Koser | G06F 1/1616 |
| | | | 361/679.58 |
| 2015/0309539 A1* | 10/2015 | Kamphuis | G06F 1/1681 |
| | | | 361/679.27 |
| 2015/0362958 A1* | 12/2015 | Shang | G06F 1/1681 |
| | | | 361/679.58 |
| 2016/0011632 A1* | 1/2016 | Hsu | E05D 3/122 |
| | | | 16/354 |
| 2016/0060927 A1* | 3/2016 | Xu | E05D 3/122 |
| | | | 361/679.55 |
| 2016/0187934 A1* | 6/2016 | Lee | G06F 1/1618 |
| | | | 361/679.56 |
| 2018/0032110 A1* | 2/2018 | Hsu | G06F 1/1681 |

* cited by examiner

HINGE ASSEMBLY

TECHNICAL FIELD

Subject matter disclosed herein generally relates to technology for a computing device.

BACKGROUND

A computing device can include various components such as housings coupled via one or more hinge assemblies.

SUMMARY

A computing device can include a chassis; a circuit board coupled to the chassis; a processor operatively coupled to the circuit board; and memory accessible by the processor; where the chassis includes a first end, an opposing second end, a first side that includes feet, and an opposing second side that includes feet, and where at least one of the first end and the second end includes an electrical component that is positioned closer to one of the first side and the second side. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
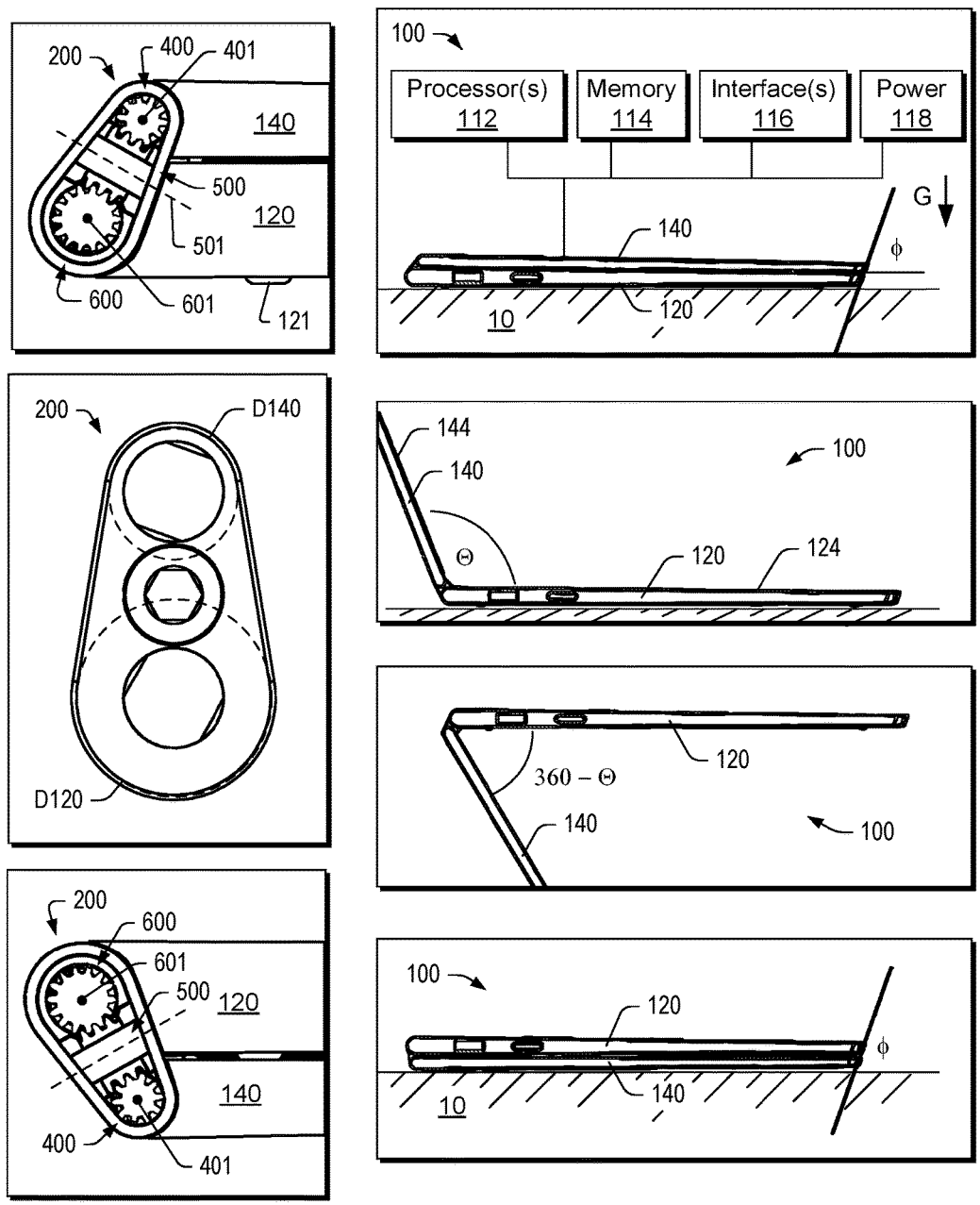
FIG. 1 is a series of view of an example of a computing device that includes an example of a hinge assembly.

FIG. 1 shows an example of a computing device 100 seated on a surface 10. The computing device 100 can be defined with respect to one or more coordinate systems (e.g., one or more Cartesian coordinate systems with x, y and z coordinates, which may be referred to as x, y and z axes or directions).

As an example, the computing device 100 may be defined in part by a form factor. As an example, the computing device 100 may be defined in part by a clamshell form factor, which may be referred to as a laptop form factor. As an example, the computing device 100 may be referred to as a laptop (e.g., or laptop computing device or laptop computer), a notebook (e.g., or a notebook computing device or a notebook computer), a portable (e.g., a portable computing device or a portable computer).

As an example, a clamshell form factor can include housings operatively coupled by at least one hinge assembly. For example, the computing device 100 of FIG. 1 includes a first housing 120 and a second housing 140 operatively coupled by a hinge assembly 200. As an example, the first housing 120 can include one or more feet 121, which may be provided to support the first housing 120 on a surface such as a surface of a desk, a table, etc. As an example, a foot may be defined by a dimension that can space one or more portions of the first housing 120 above a surface (e.g., a support surface), for example, to provide for air flow, etc. As an example, a foot may be made of a material that is resilient, optionally an elastomeric material, which may help to absorb vibration, shock, etc. As an example, a foot may provide for friction that can help to hinder sliding of a computing device on a support surface.

As an example, a housing can include a keyboard and be referred to as a keyboard housing and a housing can include a display and be referred to as a display housing. For example, consider a computing device that includes an alphanumeric keyboard as a lower part of a clamshell and a display (e.g., LCD, LED, etc.) as an upper part of a clamshell. In the example of FIG. 1, the housing 140 includes a display 144 and may therefore be referred to as a display housing and the housing 120 includes a keyboard 124 and therefore may be referred to as a keyboard housing.

The computing device 100 can include various components. For example, the computing device 100 can include one or more processors 112, memory 114 accessible by at least one of the one or more processors 112, one or more interfaces 116 and one or more power connectors and/or power sources 118. The display 144 and the keyboard 124 can be operatively coupled to at least one of the one or more processors 112 (e.g., one or more processing cores, etc.).

The computing device 100 can include one or more of an input, an output, a speaker, a drive, a pointing device (e.g., a touchpad, a trackpad, a TRACKPOINT controller, etc.), a camera, a microphone, a battery, etc.

A computing device can include various orientations such as, for example, a closed orientation, an open orientation and a tablet orientation. FIG. 1 shows the computing device 100 in a closed orientation (top, e.g., Θ approximately 0 degrees), two open orientations (e.g., Θ approximately 110 degrees and Θ approximately 290 degrees) and a tablet orientation (bottom, e.g., Θ approximately 360 degrees). As an example, a clamshell form factor computing device may be folded shut (e.g., to a closed orientation) for transportation (e.g., making it suitable for mobile use). As to the example foot 121, in the closed orientation, it may provide for support on a surface and, in a tablet orientation, it may provide for defining a space between the housing 140 and the housing 120. While the example of FIG. 1 shows the housing 120 as including a foot as a feature, the housing 140 may optionally include one or more features that can be provided as contact features (e.g., for contacting the housing 120, a support surface, etc.).

As an example, one or more wires, electrical connectors, etc. may operatively couple circuitry disposed at least in part in one housing with circuitry disposed at least in part in another housing. For example, the computing device 100 may include one or more wiring harnesses that can accommodate various orientations. As an example, a wiring harness may flex responsive to movement of one or more housings about a hinge assembly or hinge assemblies.

In the example of FIG. 1, a front end of the housing 120 and a front end of the housing 140 can define an angle φ in the closed orientation where the angle φ may be defined with respect to a plane (e.g., a plane of the surface 10, a plane of the display 144, a plane of the keyboard 122, etc.). As shown, with respect to a plane of the surface 10, the angle φ may be less than 90 degrees. As shown in the example of FIG. 1, the angle φ may be approximately the same in the closed orientation and the tablet orientation.

In the example of FIG. 1, the plane of the surface 10 may be an x,y-plane where a z-direction is in a direction of gravity (G). In such an example, x, y and z can be Cartesian coordinate directions or axes. As an example, a thickness of the computing device 100 can be defined in a z-direction (e.g., along a z-axis). As an example, a thickness of the housing 120 can be defined in a z-direction and a thickness of the housing 140 can be defined in a z-direction. As an example, the housing 120 can be defined in its own 3D Cartesian coordinate system (e.g., $x_1$, $y_1$ and $z_1$) and the housing 140 can be defined in its own 3D Cartesian coordinate system (e.g., $x_2$, $y_2$ and $z_2$). In such an example, the angle Θ may define an angle between the two 3D Cartesian coordinate systems. For example, consider a plane defined approximately by the display 144 of the housing 140 being an $x_2,y_2$-plane and a plane defined approximately by the keyboard 124 of the housing 120 being an $x_1,y_1$-plane. In such an example, the angle Θ may be varied via the hinge assembly 200 to orient the two planes of the two housing 120 and 140.

In the example of FIG. 1, a back end angle may be defined at least in part via the hinge assembly 200. In the example of FIG. 1, the hinge assembly 200 can be defined at least in part via two circles: D120 as a circle that may correspond to a dimension of the housing 120 (e.g., a thickness of the housing 120) and D140 as a circle that may correspond to a dimension of the housing 140 (e.g., a thickness of the housing 140). The circles D120 and D140 can be defined at least in part by corresponding diameters where the diameter of the circle D120 may exceed the diameter of the circle D140. In such an example, the diameters can define an angle and/or an offset angle. For example, in the closed orientation of the computing device 100, an angle may be defined by a line that extends between axes of the two circles D120 and D140 and an angle may be defined in part by a line that extends between perimeters of the two circles D120 and D140. As an example, the angle that is defined by the line that extends between perimeters of the two circles D120 and D140 (e.g., a line tangent to circumferences of the two circles D120 and D140) can be approximately the same as the angle φ at the front ends of the housings 120 and 140 when the computing device 100 is in the closed orientation. In such an example, a profile of the computing device 100 may be approximately a parallelepiped (e.g., two sets of parallel sides).

In the example of FIG. 1, the hinge assembly 200 includes a first set of components 400, a second set of components 600 and an intermediate set of components 500. As shown, the first set of components 400 are oriented along a first rotational axis 401, the second set of components 600 are oriented along a second rotational axis 601 and the intermediate set of components 500 include an intermediate rotational axis 501. In the example of FIG. 1, the rotational axes 401 and 601 are substantially parallel. The rotational axis 401 may be defined as extending in an $x_2$ direction (e.g., as associated with a Cartesian coordinate system of the housing 140) and the rotational axis 601 may be defines as extending in an $x_1$ direction (e.g., as associated with a Cartesian coordinate system of the housing 120). In the example of FIG. 1, the rotational axis 501 is substantially perpendicular to a line drawn between the rotational axis 401 and the rotational axis 601. As an example, the hinge assembly 200 as shown in the example of FIG. 1 may be defined as being pear-shaped.

As an example, a hinge assembly may be defined at least in part via a common tangent as a line between two circles (e.g., a line that is tangent to each of two coplanar circles). As an example, a common tangent may be tangent internally or externally, noting that where two circles contact each other a tangent line may exist for that contact point. A common external tangent is a common tangent that does not intersect a segment that joins the centers of the two circles.

The points of tangency $t_1$ and $t_2$ for the four lines tangent to two circles with centers $\zeta_1$ and $\zeta_2$ (e.g., along an $\zeta$ axis) and radii $r_1$ and $r_2$ are given by solving the simultaneous equations:

$$(t_2-\zeta_2)\cdot(t_2-t_1)=0 \quad (1)$$

$$(t_1-\zeta_1)\cdot(t_2-t_1)=0 \quad (2)$$

$$|t_1-\zeta_1|^2=r_1^2 \quad (3)$$

$$|t_2-\zeta_2|^2=r_2^2 \quad (4)$$

The point of intersection of the two crossing tangents is called the internal similitude center and the point of intersection of the extensions of the other two tangents is called the external similitude center. As an example, a cross-sectional profile of a hinge assembly may be defined at least in part by one or more tangents.

As an example, the circle D120 and the circle D140 may be defined by radii that correspond to the radii $r_1$ and $r_2$. As an example, such radii may define a shape or part of a shape of a hinge assembly and/or may define a ratio of a hinge assembly.

As an example, a hinge assembly may include one or more belts where such one or more belts may be operatively coupled to axles where the one or more belts define one or more common tangents as to the axles. As an example, a hinge assembly may include one or more chains where such one or more chains may be operatively coupled to axles where the one or more chains define one or more common tangents as to the axles. As an example, a hinge assembly may include one or more friction wheels where, for example, rotation of one friction wheel causes rotation of another component, which may be a friction wheel. As an example, a hinge assembly may include gears where, for example, a gear casing may optionally be shaped in a manner where the shape can be defined at least in part by one or more common tangents.

As an example, a portion of a hinge assembly may include, as a coupling mechanism, a belt, a friction wheel, a chain and/or a gear where the coupling mechanism couples two hollow axles or where the coupling mechanism couples two axles that are received at least in part by bores of two hollow axles. In the foregoing hinge assembly, such a coupling mechanism may be referred to as a homogeneous coupling mechanism in that it couples rotational motion of two like axles.

As an example, a coupling mechanism can include gears such as, for example, helical gears, that is heterogeneous in its coupling. For example, a heterogeneous coupling mechanism can couple rotational motion of a hollow axle and rotational motion of an axle that is received at least in part by a hollow axle that is not the hollow axle being directly rotatably coupled.

As an example, axles may be defined by a distance therebetween, which may be, for example, defined by an ζ axis. For example, in FIG. 1, a straight line drawn between the rotational axes 401 and 601 can define such an ζ axis, which may be utilized, for example, to define one or more tangents and/or one or more other features (e.g., structural and/or functional).

Figure 2:
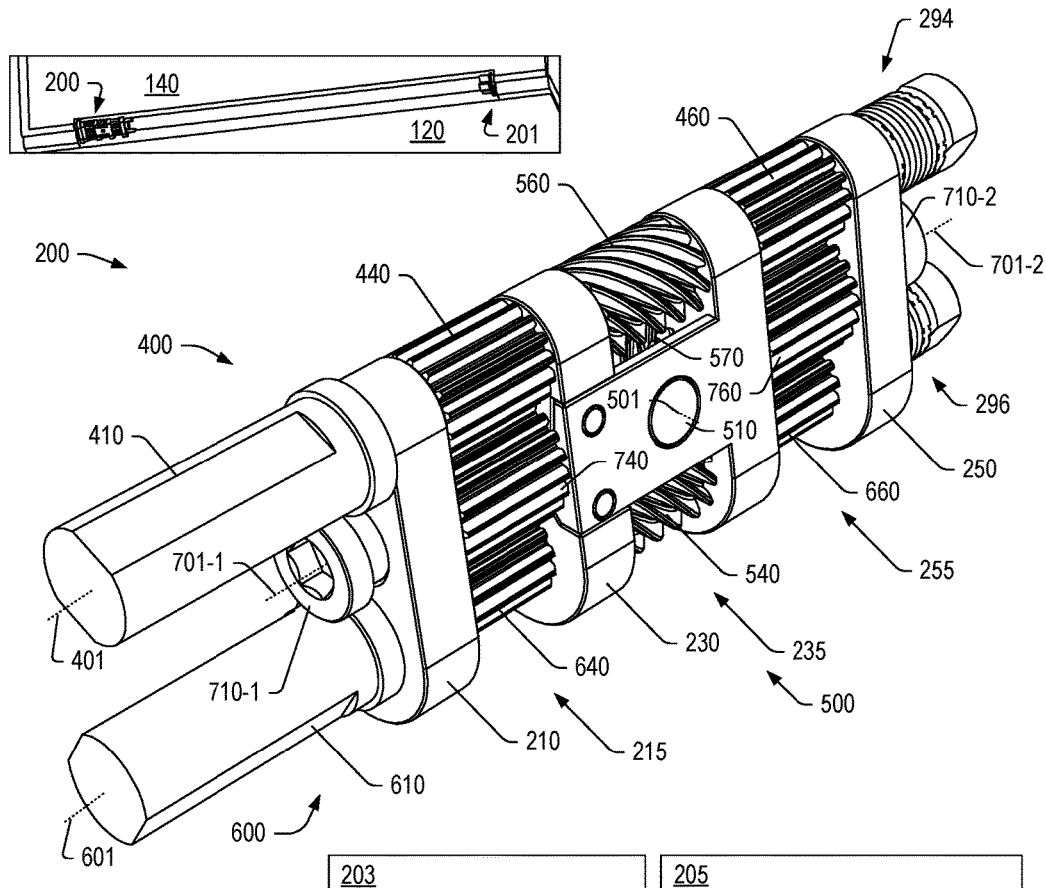
FIG. 2 is a perspective view of an example of the hinge assembly of FIG. 1, examples of sockets of housings, and example tables.
Figure 2:
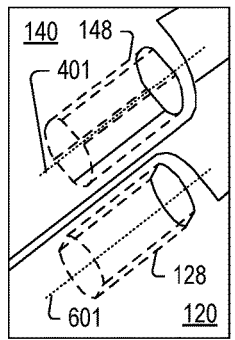

FIG. 2 shows an example of the hinge assembly 200 that includes gears. As mentioned, a hinge assembly may include one or more gears, one or more belts and/or one or more chain (e.g., a chain belt).

Figure 5:
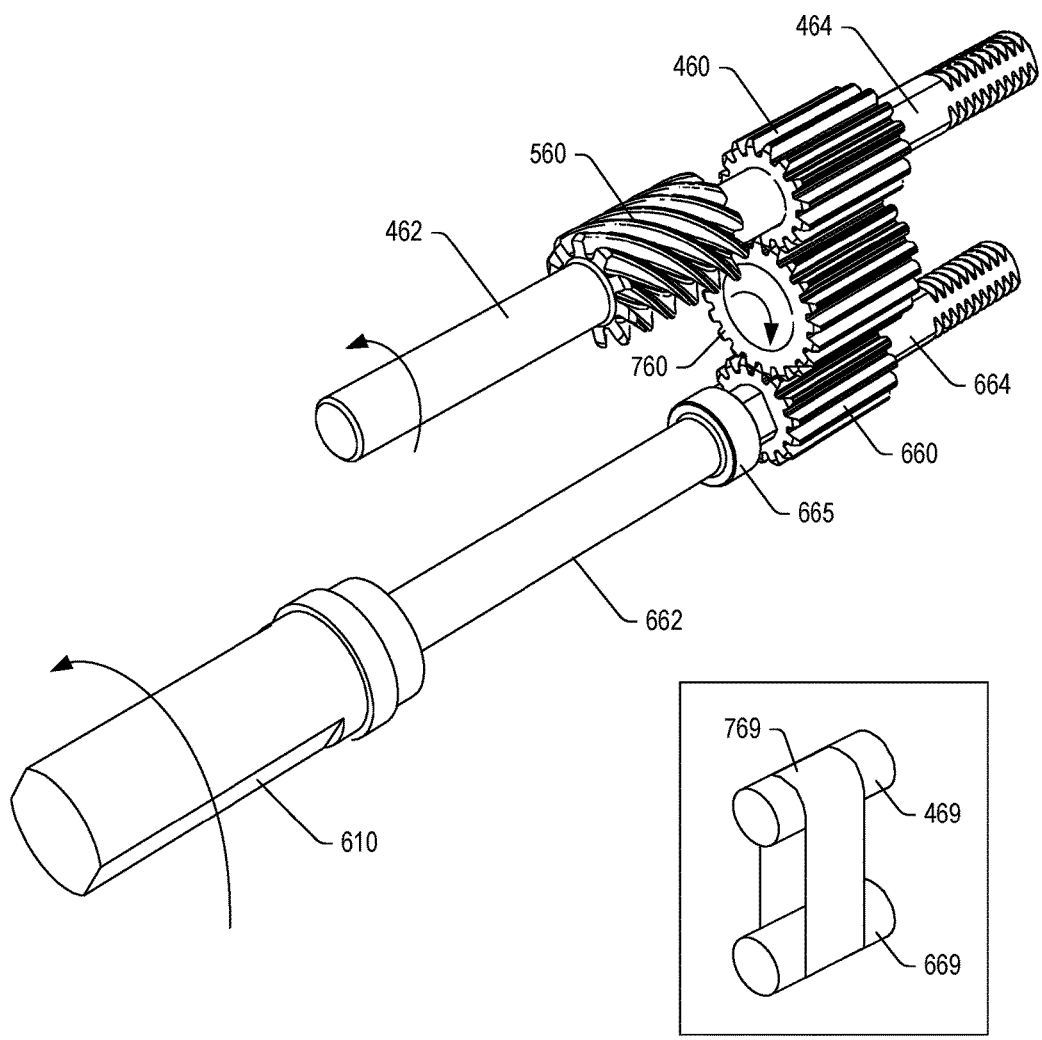
FIG. 5 is a perspective view of an example of a portion of the hinge assembly of FIG. 1.

As an example, the computing device 200 can include the first housing 120 that includes a first thickness, the second housing 140 that includes a second thickness; and the hinge assembly 200 that couples the first and second housings 120 and 140 where the hinge assembly 200 includes two hollow axles 440 and 640 operatively coupled to the second housing 140; a coupling mechanism 740 (e.g., or a belt or a chain or a friction wheel) that couples the two hollow axles 440 and 640; two axles 462 and 662 (see, e.g., FIG. 5), each received by a respective bore of one of the hollow axles 440 and 640, operatively coupled to the first housing 120; and a coupling mechanism 760 (e.g., or a belt or a chain or a friction wheel) that couples the two axles 462 and 662 (see, e.g., FIG. 5). In such an example, the hollow axles 440 and 640 may be referred to as outer axles and the axles 462 and 662 may be referred to as inner axles in that they are each received at least in part by a respective one of the hollow axles 440 and 640.

FIG. 2 shows the hinge assembly 200 as including housing connectors 410 and 610 where the housing connector 410 can connect to the housing 140 and where the housing connector 610 can connect to the housing 120. For example, the housing 120 can include a keyed socket 128 and the housing 140 can include a keyed socket 148 such that the housing connector 610 can be keyed and received by the keyed socket 148 and such that the housing connector 410 can be keyed and received by the keyed socket 128. As shown in FIG. 2, the housing 120 and the housing 140 can be coupled via the hinge assembly 200 and, for example, optionally a guide assembly 201 which can include housing connectors received in corresponding housing sockets where the guide assembly 201 may be for support (e.g., optionally without rotational interconnection of the connectors). As an example, a coupling or spacer may space apart two housing connectors (e.g., axles) of a guide assembly such as the guide assembly 201.

As shown in the example of FIG. 2, the hinge assembly 200 includes guides 210, 230 and 250 that define three regions 215, 235 and 255. In the example of FIG. 2, the guides 210, 230 and 250 can support axles in a manner that spaces the axles (e.g., in substantially parallel and/or substantially perpendicular arrangements).

As shown in FIG. 2, the first region 215 includes the hollow axle 440, the coupling mechanism 740 and the hollow axle 640. The housing connector 410 is operatively coupled to the hollow axle 440 such that rotation of the housing connector 410 causes rotation of the hollow axle 440, the coupling mechanism 740 and the hollow axle 640. For example, the hollow axle 440 and the housing connector 410 may couple via key-keyway coupling (see, e.g., FIG. 3, FIG. 4, etc.). As shown in FIG. 2, the coupling mechanism 740 is a gear that is supported on an axle 710-1 with an axis 701-1, which is supported by at least the guide 210 (e.g., and optionally the guide 230). As an example, the coupling mechanism 740 may optionally be a friction wheel, a belt, etc. As to a friction wheel, the hollow axle 440 may be or include a friction wheel and the hollow axle 640 may be or include a friction wheel (e.g., frictional coupling may be utilized for the hollow axle 440, the coupling mechanism 740 and the hollow axle 640).

As shown in FIG. 2, the third region 255 includes features that can allow for coupling of axles 462 and 662 (see, e.g., FIG. 5). As an example, such features can be defined in part by a cross-sectional dimension. As an example, such features may be gears. For example, as shown in FIG. 2, a gear 460 is coupled to the axle 462 (see, e.g., FIG. 5; noting that the gear 460 may be integral to the axle 462), the gear 460 is coupled to the coupling mechanism 760 and the gear 660 is coupled to the coupling mechanism 760 and coupled to the axle 662 (see, e.g., FIG. 5; noting that the gear 660 may be integral to the axle 662). As an example, the gear 460 and the axle 462 may couple via key-keyway coupling (e.g., the axle 462 may include a keyed portion 464 as shown in FIG. 5 and the gear 460 may be keyed to match) and/or the gear 660 and the axle 662 may couple via key-keyway coupling (e.g., the axle 662 may include a keyed portion 664 as shown in FIG. 5 and the gear 660 may be keyed to match). In the example of FIG. 2, the housing connector 610 is operatively coupled to the axle 662 (e.g., integrally, interference-fit, welded, glued, etc.) such that rotation of the housing connector 610 causes rotation of the gear 660, the coupling mechanism 760 and the gear 460, which is coupled to the axle 462. As shown in FIG. 2, the coupling mechanism 760 is a gear that is supported on an axle 710-2, which is supported by at least the guide 250 (e.g., and optionally the guide 230) and which has an axis 701-2. In various examples, a coupling mechanism may be a belt, a chain or other type of rotational transfer component that can cause rotation of the axles 462 and 662 (e.g., in unison, etc.). As an example, the coupling mechanism 760 may optionally be a friction wheel, a belt, etc. As to a friction wheel, the axle 462 may be or include a friction wheel and the axle 662 may be or include a friction wheel (e.g., frictional coupling may be utilized for the axle 462, the coupling mechanism 760 and the axle 662).

The second region 235 includes a gear 540, a gear 560 and a gear 570. As shown in the example of FIG. 2, the gear 570 is supported on an axle 510 that defines the rotational axis 501 where the axle 510 is supported by the guide 230. In the example of FIG. 2, the gear 560 is fixed to the axle 462 (see, e.g., FIG. 5) via integral formation thereof with the axle 462, interference-fitting thereof to the axle 462, welding or gluing (e.g., adhesive) thereof to the axle 462, etc.; and the gear 540 is a hollow axle gear that is operatively coupled to the hollow axle 640. For example, the hollow axle 640 and the gear 540 may couple via key-keyway coupling, integrally, etc.

In the example of FIG. 2, end components 294 and 296 may be utilized, for example, to maintain components of the hinge assembly 200 and/or to apply force (e.g., load) to various components of the hinge assembly 200. As an example, the end components can include washers, spacers, springs, nuts, etc. As an example, an axle may be threaded over at least a portion, which may optionally be a keyed portion. In such an example, a nut can include matching threads. As an example, a torque wrench or other tool may be utilized to tighten a nut to a specified or desired level of torque, which may, for example, account for one or more loads (e.g., springs, etc.). As an example, a washer may be a Bellville washer (e.g., a cone washer). As an example, the end components 294 and 296 may apply a force that acts to control friction. Such force may be adjustable such that transitioning the computing device 100 from one orientation to another is suitable for a user while also, for example, allowing the computing device 100 to retain a desired orientation (e.g., to maintain the orientation without change due to the influence of gravity).

As an example, a hinge assembly can include one or more idler gears. For example, an idler gear can be a gear that is inserted between two or more other gears. As an example, an idler gear may be utilized to change the direction of rotation of an axle and, for example, to help to reduce the size of one or more input/output gears while maintaining a spacing of the axles.

In general, an idler gear does not affect the gear ratio between input and output axles (e.g., input and output shafts). In a sequence of gears meshed or chained together, the ratio depends on the number of teeth on the first and last gear. Intermediate gears, regardless of size, do not alter an overall gear ratio. As an example, addition of one or more intermediate gears can act to control direction of rotation of a final gear. For example, in FIG. 2, the gears 740 and 760 can be referred to as idler gears where the gear 740 rotates in a rotational direction opposite that of the housing connector 410 and where the gear 760 rotates in a rotational direction opposite that of the housing connector 610. In such an arrangement, the hollow axle 640 rotates in the same rotational direction as the housing connector 410 (noting that the hollow axle 640 rotates about the rotational axis 601 while the housing connector 410 rotates about the rotational axis 401) and the gear 460 (e.g., as fixed to the axle 462) rotates in the same rotational direction as the housing connector 610 (noting that the gear 460 rotates about the rotational axis 401 while the housing connector 610 rotates about the rotational axis 601).

In the example of FIG. 2, the gears 540, 560 and 570 are helical gears. A helical gear includes leading edges of teeth that are not parallel to the axis of rotation (e.g., as with longitudinally cut teeth), but are set at an angle where angling makes tooth shape a segment of a helix (e.g., with a rotational span defined by an angle). Helical gears may be meshed in parallel or crossed orientations. The former refers to when the axles (e.g., shafts) are substantially parallel to each other while the latter refers to axles (e.g., shafts) that are non-parallel (e.g., skew gears).

Figure 3:
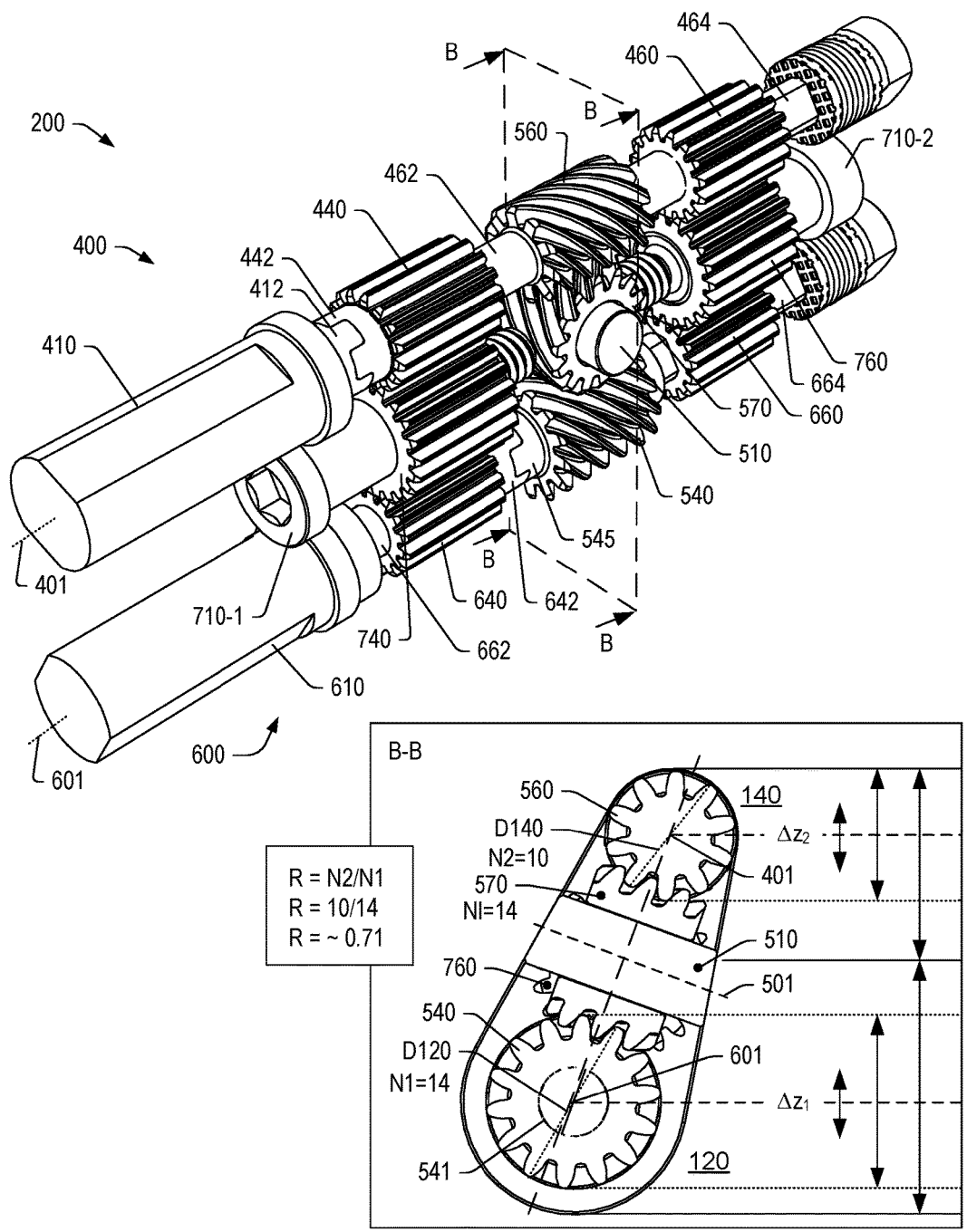
FIG. 3 is a perspective view of an example of the hinge assembly of FIG. 2 and a cross-sectional, cutaway view of a portion thereof.

In the example of FIG. 2, as explained with respect to FIG. 3, the gears 540, 560 and 570 can be utilized to operatively couple a hollow axle and an axle, optionally according to a gear ratio, which may optionally differ from unity. As an example, the gears 540, 560 and 570 of the second region 235 may be referred to as a transmission in that they transmit motion of the housing connector 410 to the housing connector 610 or vice versa (e.g., via operatively coupling a hollow axle and an axle).

FIG. 2 includes two tables 203 and 205 that identify rotational directions of various components of the example hinge assembly 200. One table can represent hinge assembly components of the hinge assembly 200 during transition of housings 120 and 140 in one direction and the other table can represent hinge assembly components of the hinge assembly 200 during transition of housing 120 and 140 in another, opposition direction.

FIG. 3 shows the hinge assembly 200 of FIG. 2 without the guides 210, 230 and 250. In the view of FIG. 3, the axles 710-1 and 710-2 are visible and are shown to include portions thereof that can be received at least in part by the guide 230 (e.g., consider threads, etc., that can be received in threaded bores, etc.).

In the example of FIG. 3, the housing connector 410 includes a key-keyway coupling 412 and 442 with the hollow axle 440, which is a geared hollow axle (e.g., a hollow axle gear), and the hollow axle 640, which is a geared hollow axle (e.g., a hollow axle gear), includes a key-keyway coupling 642 and 545 with the gear 540.

FIG. 3 also shows the axle 462 and a portion 464 thereof that is keyed where the gear 460 can be similarly keyed such that key and keyway match to cause the gear 460 to rotate in unison with the axle 462. Also shown in FIG. 3 is the axle 662 and a portion 664 thereof that is keyed where the gear 660 can be similarly keyed such that key and keyway match to cause the gear 660 to rotate in unison with the axle 662.

In the view of FIG. 3, the hollow axle 440 is shown as including a bore that can receive the axle 462 and the hollow axle 640 is shown as including a bore that can receive the axle 662; noting that the gear 540 is also hollow such that a portion of the axle 662 is received by a bore 541 of the gear 540. In such an arrangement, the axles 462 and 662 are rotatable in a rotational direction that differs from that of the housing connector 410 and/or the hollow axles 440 and 640 and/or the gear 540.

The example hinge assembly 200 may be defined as including "trains" of rotatable components where one train can include components labeled 440, 540, 640 and 740 (e.g., a first train) and where another train can include components labeled 460, 560, 660 and 760 (e.g., a second train). In such an example, the first train can be a hollow axle train and the second train can be an axle train that includes axle portions received by bores of the hollow axle train. As an example, the aforementioned two trains may be coupled, for example, via a component or components (e.g., the gear 570 may rotatably couple the gear 540 as a component of the first train and the gear 560 as a component of the second train). As shown in FIG. 2, FIG. 3 and FIG. 5, the axle 462 is concentric with the hollow axle 440 and shares the axis 401 as a common axis and the axle 662 is concentric with the hollow axle 640 and shares the axis 601 as a common axis. As to degree of concentricity, some amount of clearance may exist where an axle may be within limits of the clearance displaced slightly from a bore of a hollow axle (e.g., to form an eccentric clearance). Such a clearance may depend on tolerances of various components as manufactured, as assembled, as experiencing normal wear, etc. As an example, one or more of the guides 210, 230 and 250 may help to maintain concentricity. Given tolerances that may be expected, the concentricity of a hollow axle and an axle can be considered to be substantially concentric (e.g., a displacement of axles axes that is generally less than approximately 5 mm).

As an example, the computing device 100 of FIG. 1 can include one or more of the hinge assemblies 200. As an example, the computing device 100 of FIG. 1 can include a single one of the hinge assembly 200 and, for example, optionally a bushing guide assembly that may be passive (e.g., without meshing, belted, chained components, etc.) such as the guide assembly 201 of FIG. 2.

FIG. 3 shows an inset cross-sectional cutaway view of a portion of the hinge assembly 200 along a line B-B (see, e.g., a cutting plane defined by lines B-B). In the example of FIG. 3, the computing device 200 can include the first housing 120 that includes a first thickness, which may be identified by a dimension $\Delta z_1$, the second housing 140 that includes a second thickness, which may be identified by a dimension Δz$_2$; and the hinge assembly 200 that couples the first and second housings 120 and 140 where the hinge assembly includes two hollow axles 440 and 640 operatively coupled to the second housing 140 where the two hollow axles 440 and 640 are offset and substantially parallel to one another; a coupling mechanism 740 (e.g., or a belt, a chain, a friction wheel, etc.) that couples the two hollow axles 440 and 640 (e.g., disposed between the two hollow axles 440 and 640, etc.); two axles 462 and 662 (see, e.g., FIG. 5), each received by a respective bore of one of the hollow axles 440 and 640 such that the two axles 462 and 662 are offset and substantially parallel to one another and where the two axles 462 and 662 are operatively coupled to the first housing 120; and a coupling mechanism 760 (e.g., or a belt, a chain, a friction wheel, etc.) that couples the two axles 462 and 662 (see, e.g., FIG. 5) (e.g., disposed between the two axles 462 and 662, etc.).

In the example of FIG. 3, the dimensions Δz$_1$ and dimension Δz$_2$ may be selected as desired, which may be within respective ranges. For example, the first housing 120 and the second housing 140 may be of thicknesses that may define an overall thickness of the computing device 100 in a closed orientation. Where the hinge assembly 200 is set at an angle as shown in the inset view of FIG. 3, the overall thickness may be less than a length of the hinge assembly 200 along a line that intersects the axes 401 and 601 (e.g., consider the length as being approximated as a hypotenuse of a triangle with one leg in the z-direction). In the example of FIG. 3, the first housing 120 and the second housing 140 may be substantially parallel, as mentioned, a computing device may include a profile that is approximately that of a parallelepiped, for example, when in a closed orientation. As an example, in a tablet orientation, a profile may differ from that of a closed orientation (see, e.g., FIG. 1). In such an example, housings may be substantially parallel while a front end is at one angle (e.g., ϕ) and a back end is at a different angle (e.g., ~180−ϕ). As an example, a computing device may include, in a closed orientation, an overall thickness that is thicker at a back end than a front end. For example, a small amount of slope may exist such that when a housing (e.g., a keyboard housing) is on a horizontal surface, another housing (e.g., a display housing), which is coupled to the housing via at least a hinge assembly, may be at a slope with respect to the horizontal surface (e.g., defined by a slope angle). In such an example, the slope angle may be less than approximately minus 10 degrees (e.g., from back end to front end). Such a slope may be due to one or more of the housings including a back end thickness that is greater than a front end thickness.

In the example of FIG. 3, the gear 570 is shown as being a single idler gear and, in particular, a helical idler gear; noting that the gear 760 is seen as being partially obscured because it is behind the gear 570. As an example, such a gear may provide for spacing apart the axes 401 and 601 of the gears 540 and 560, respectively. As an example, more than one gear may be utilized as an intermediate gear that is intermediate the gears 540 and 560. As an example, a gear may be larger in diameter or smaller in diameter than the gear 570 of the example of FIG. 3 (e.g., as measured relative to the gear 540 and/or the gear 560). As an example, one or more gears may be selected based at least in part on thickness of a housing or thicknesses of housings, for example, to allow for various orientations of a computing device (e.g., a closed orientation, a tablet orientation, etc.).

As an example, an angle of a hinge assembly may be determined by a closed orientation of two housing that are coupled via the hinge assembly (e.g., at least in part via the hinge assembly). As an example, an angle may be selected to accommodate thicknesses. For example, an angle of approximately 90 degrees with respect to horizontal may accommodate a greatest overall thickness of two housings while a lesser angle (e.g., in a range of approximately 30 degrees to less than approximately 90 degrees) may accommodate a lesser over thickness of two housings.

As an example, housings may contact in a closed orientation where such contact may be via a surface or surfaces of one housing and a surface or surfaces of another housing. As an example, a space can exist in a closed orientation that may be configured to avoid direct contact between, for example, surfaces of keys of a keyboard and a surface of a display. As an example, a housing can include elastomeric or other material that may be provided as a cover material, a raised feature (e.g., spacer or spacers), etc. In the example of FIG. 1, as mentioned, the housing 120 is shown as including a foot 121; noting that the housing 120 may optionally include a plurality of feet. As mentioned, one or more housings of a computing device may optionally include one or more features that are contact features. Where a contact feature or features provide for spacing apart housings in a closed orientation, a hinge assembly via structure and/or orientation may accommodate such a feature or features with respect to thickness or thicknesses of the housings.

In explaining the example of FIG. 3, the gear 540 can be referred to as the hollow axle gear 540 as associated with the hollow axle 640 and the gear 560 can be referred to as the axle gear 560 as associated with the axle 462. As an example, one of the two axles 462 and 662 can be operatively coupled to one of the hollow axles 440 and 640 via a coupling mechanism, which, in the example of FIG. 3, includes the idler gear 570 as an off-axis (as to the axis 501 with respect to the axes 401 and 601) coupling mechanism that rotates in unison with the hollow axle gear 540 and the axle gear 560. In such an example, the hollow axle gear 540 and the axle gear 560 can include teeth that determine a gear ratio. For example, in FIG. 3, the hollow axle gear 540 is shown as including 14 teeth while the axle gear 560 is shown as including 10 teeth such that a gear ratio may be expressed as R=10/14 (e.g., or in an alternative convention Ra=14/10).

Referring again to FIG. 1, as shown in the various orientations, the housing 140 can be transitioned from the closed orientation to the tablet orientation (e.g., and vice versa) where its motion is linked to the hollow axle gear 540 while motion of the housing 120 is linked to the axle gear 560. In such an arrangement, the hollow axle gear 540 is displaced from its corresponding housing, the housing 140, while the axle gear 560 is displaced from its corresponding housing, the housing 120. As mentioned, the axle gear 560 can be smaller in diameter than the hollow axle gear 540 and, accordingly, the hollow axle gear 540 can be larger in diameter than the axle gear 560. The example "swapping" arrangement of FIG. 3, achieved through use of axles and hollow axles, allows the larger gear (e.g., the hollow axle gear 540) to be positioned in alignment with the thicker of the two housings (e.g., the housing 120) while the smaller gear (e.g., the axle gear 560) can be positioned in alignment with the thinner of the two housings (e.g., the housing 140). As mentioned, the diameter of the hollow axle gear 540 and the diameter of the axle gear 560 can determine a gear ratio. For example, a gear ratio can be selected and implemented to allow for the transitions of the housings 120 and 140 of the computing device 100 while, for example, maintaining a sleek arrangement of the housings 120 and 140 and the hinge assembly 200 that operatively couples the two housings 120 and 140. For example, the housing 140 can be a display housing that includes a display where the housing 140 is to be thin while the housing 120 can be a keyboard housing that includes a keyboard where the housing 120 is to be thicker than the housing 140.

As shown in FIG. 3, the hollow axle 640 is extended via the hollow axle 540, which may be a separate piece or an integral piece to the hollow axle 640. For example, the hollow axle 540 and the hollow axle 640 may be made as a single piece (e.g., via one or more of casting, molding, machining, etc.) or, for example, the hollow axle 540 and the hollow axle 640 may be operatively coupled via one or more features such as, for example, the key-keyway coupling 545 and 642. In the example of FIG. 3, the hollow axle 540 and the hollow axle 640 rotate in unison, for example, as driven by rotation of the housing connector 410 and via the hollow axle 440 and the coupling mechanism 740, which can be a gear, a belt, a chain, etc.

As shown in FIG. 3, the hollow axle 540 defines a hollow axle ratio region that includes a first cross-sectional dimension D120 and the axle 462 includes an axle ratio region (e.g., the gear 560) that includes a second cross-sectional dimension D140, which is shown to be less than D120 in the example of FIG. 3. Further, the gear 570 is a coupling mechanism that is shown as being positioned to rotatably couple the hollow axle ratio region (e.g., the gear 540) and the axle ratio region (e.g., the gear 560). In the example of FIG. 3, the hollow axle 540 can be a helical gear that includes teeth (e.g., N1), the axle 462 can include the gear 560, which can be a helical gear that includes teeth (e.g., N2), and the gear 570 can be, as a coupling mechanism, a helical idler gear that includes teeth (e.g., NI).

As shown in the tables 203 and 205 of FIG. 2, counter-clockwise rotation of the gear 540 corresponds to clockwise rotation of the gear 560 and clockwise rotation of the gear 540 corresponds to counter-clockwise rotation of the gear 560. In the example of FIG. 3, given the example gear ratios, ten rotations of the gear 540 correspond to fourteen rotations of the gear 560 or, for example, one rotation of the gear 540 corresponds to 1.4 rotations of the gear 560.

As an example, the aforementioned axle ratio region can include an axle gear (e.g., the gear 560), where the aforementioned hollow axle ratio region can include a hollow axle gear (e.g., the gear 540), where a coupling mechanism includes an idler gear (e.g., the gear 570). In such an example, the axle gear can be a helical axle gear, the hollow axle gear can be a helical hollow axle gear and the idler gear can be a helical idler gear. In such an example, a cross-sectional dimension of the helical hollow axle gear can exceed a cross-sectional dimension of the axle gear. Such an approach may provide more space, structurally, for a bore in the helical hollow axle gear. As an example, the "hollow axle" and the "axle" may be switched where, for example, a substantially concentric arrangement is maintained. For example, the gear 560 may be hollow with a bore even though it is smaller in diameter than the gear 540, in the example of FIG. 3, where the gear 540 may be fixed to an axle.

As an example, a hinge assembly can include a rotational ratio defined by a first cross-sectional dimension of a first ratio region and a second cross-sectional dimension of a second ratio region.

Figure 4:
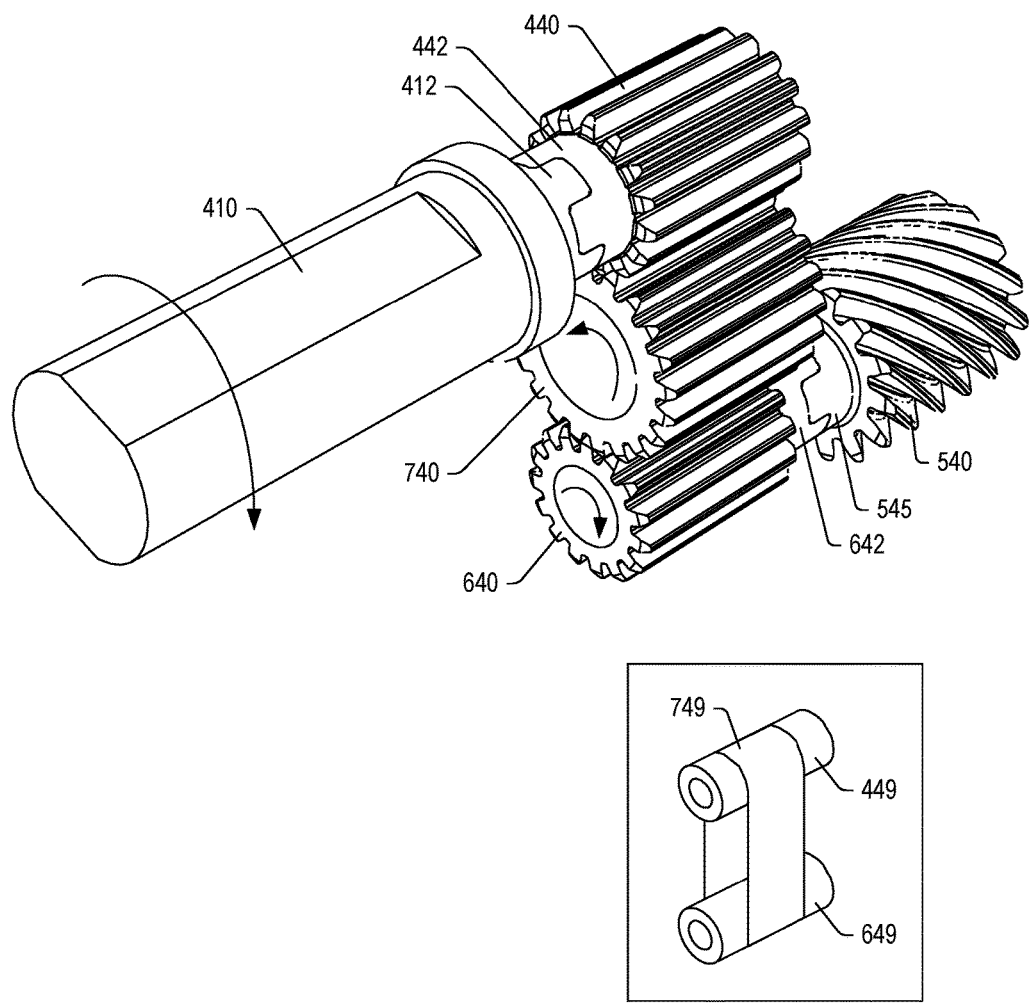
FIG. 4 is a perspective view of an example of a portion of the hinge assembly of FIG. 1.

FIG. 4 shows various components and example directions of rotation thereof responsive to clockwise rotation of the housing connector 410. The components of FIG. 4 may be referred to as a train. As shown in FIG. 4, the gear 540 rotates in unison with the hollow axle 640. As shown, the hollow axle 640 can include longitudinal teeth while the gear 540 can include helical teeth (e.g., portion of helix, etc.). As shown, the hollow axle 440 can include longitudinal teeth and, for example, the coupling mechanism 740, where it is a gear, can include longitudinal teeth and may be an idler gear.

As shown in the example of FIG. 4, the housing connector 410 and the hollow axle 440 include the key-keyway coupling 412 and 442. As an example, the housing connector 410 and the hollow axle 440 may be a unitary piece (e.g., integral) or otherwise joined to form a sub-assembly that rotates in unison.

FIG. 4 also shows an example of a coupling mechanism 749 along with an example of a hollow axle 449 and an example of a hollow axle 649. In such an example, the coupling mechanism 749 may be a belt, which may be a chain link belt (e.g., a chain belt). As mentioned, friction wheels may be employed where, for example, three wheels may be utilized with diameters that may be approximately the same as those of the hollow axles 440 and 640 and the coupling mechanism 740 of the example arrangement of FIG. 4.

FIG. 5 shows various components and example directions of rotation thereof responsive to counter-clockwise rotation of the housing connector 610. The components of FIG. 5 may be referred to as a train. As shown in FIG. 5, the gear 560 rotates in unison with the axle 662 and the axle 462. In the example of FIG. 5, the axle 662 includes the gear 660 and the axle 462 includes the gear 460; noting that belt surfaces may be utilized as an alternative to the gears 660 and 460 or, for example, a belt may include notches that can mesh with teeth of a gear or other features of a surface. As mentioned, a chain may be utilized to operatively couple the axle 662 and the axle 462.

As shown in the example of FIG. 5, the axle 662 can include the gear 660 with longitudinal teeth while the gear 560 can include helical teeth (e.g., portion of helix, etc.). As shown in the example of FIG. 5, the axle 462 can include the gear 460 with longitudinal teeth and, for example, the coupling mechanism 760, where it is a gear, can include longitudinal teeth and may be an idler gear.

As shown in the example of FIG. 5, the housing connector 610 and the axle 662 can be coupled, integral, etc., such that they rotate in unison. As an example, the housing connector 610 and the axle 662 may be a unitary piece (e.g., integral) or otherwise joined to form a sub-assembly that rotates in unison.

As an example, an axle can be formed as a unitary piece or, for example, as a plurality of pieces that are connected. For example, the axle 462 of FIG. 5 includes the gear 560 and the gear 460; while the axle 662 includes the gear 660 as well as, for example, optionally the bushing 665 (e.g., an axial locating feature). One or more of such axles may be unitary (e.g., integrally formed, machined, etc.) or a plurality of pieces.

FIG. 5 also shows an example of a coupling mechanism 769 along with an example of an axle 469 and an example of an axle 669. In such an example, the coupling mechanism 769 may be a belt, which may be a chain link belt (e.g., a chain belt). As mentioned, friction wheels may be employed where, for example, three wheels may be utilized with diameters that may be approximately the same as those of the axles 460 and 660 and the coupling mechanism 760 of the example arrangement of FIG. 5.

Figure 6:
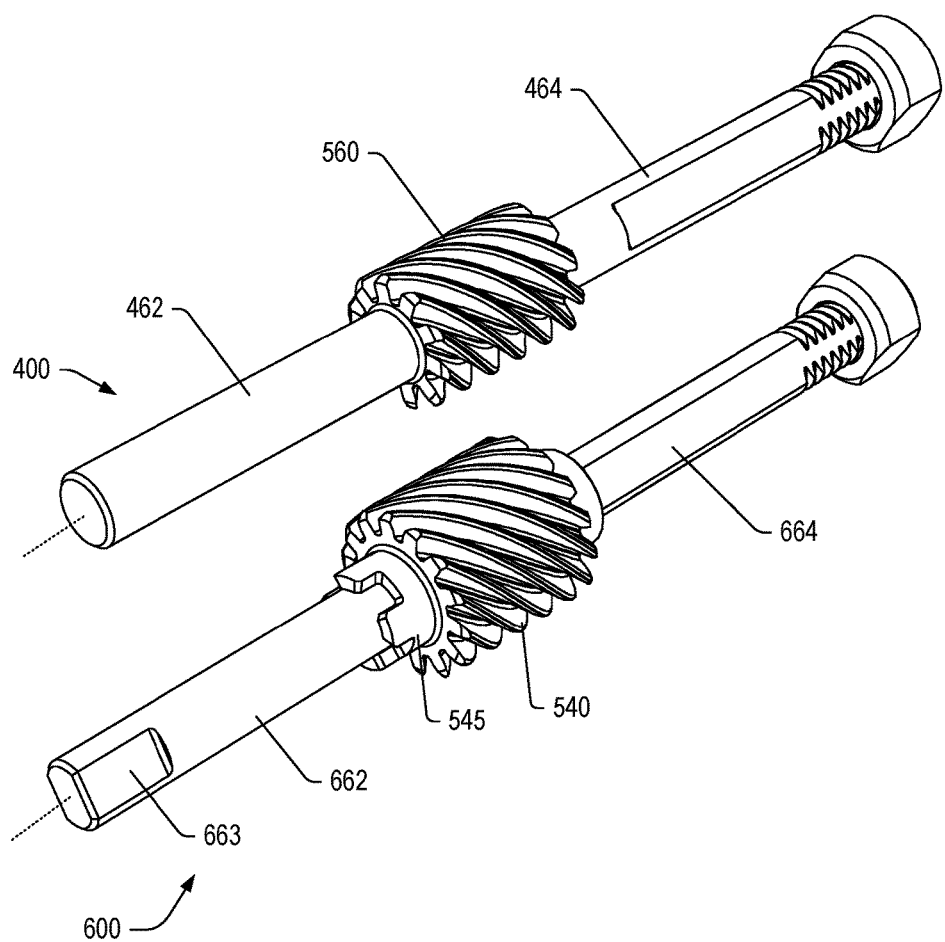
FIG. 6 is a perspective view of an example of a portion of the hinge assembly of FIG. 1.

FIG. 6 shows examples of the axles 462 and 662 where the axle 662 includes a keyed portion 663 that can be received by the housing connector 610 such that the housing connector 610 and the axle 662 rotate in unison.

As shown in FIG. 6, the gear 540 is a helical gear that is hollow such that it may be referred to as a hollow axle or a hollow axle gear. As shown, the axle 662 is disposed at least in part in a bore of the gear 540. In such an arrangement, the axle 662 can rotate without the gear 540 rotating; whereas, the gear 560 is fixed to the axle 462 such that the axle 462 and the gear 560 rotate in unison. As explained above, the gear 570 may be a coupling mechanism that couples the gears 540 and 560 such that both rotate. In such an example, a gear ratio may be defined where the gear ratio may optionally differ from unity. In such an example, one of the gears 540 and 560 can be of a smaller diameter than the other. As mentioned, a smaller diameter gear may be an axle gear while a larger diameter gear may be a hollow axle gear; noting that a smaller diameter gear may be a hollow axle gear and a larger diameter gear may be an axle gear. As an example, the axle 462 and/or the axle 662 may be solid, hollow or partially solid and partially hollow. As an example, a hollow axle can be partially solid (e.g., consider the hollow axle 440 and the housing connector 410 being a unitary piece or sub-assembly with a partially solid portion and a partially hollow portion).

Figure 7:
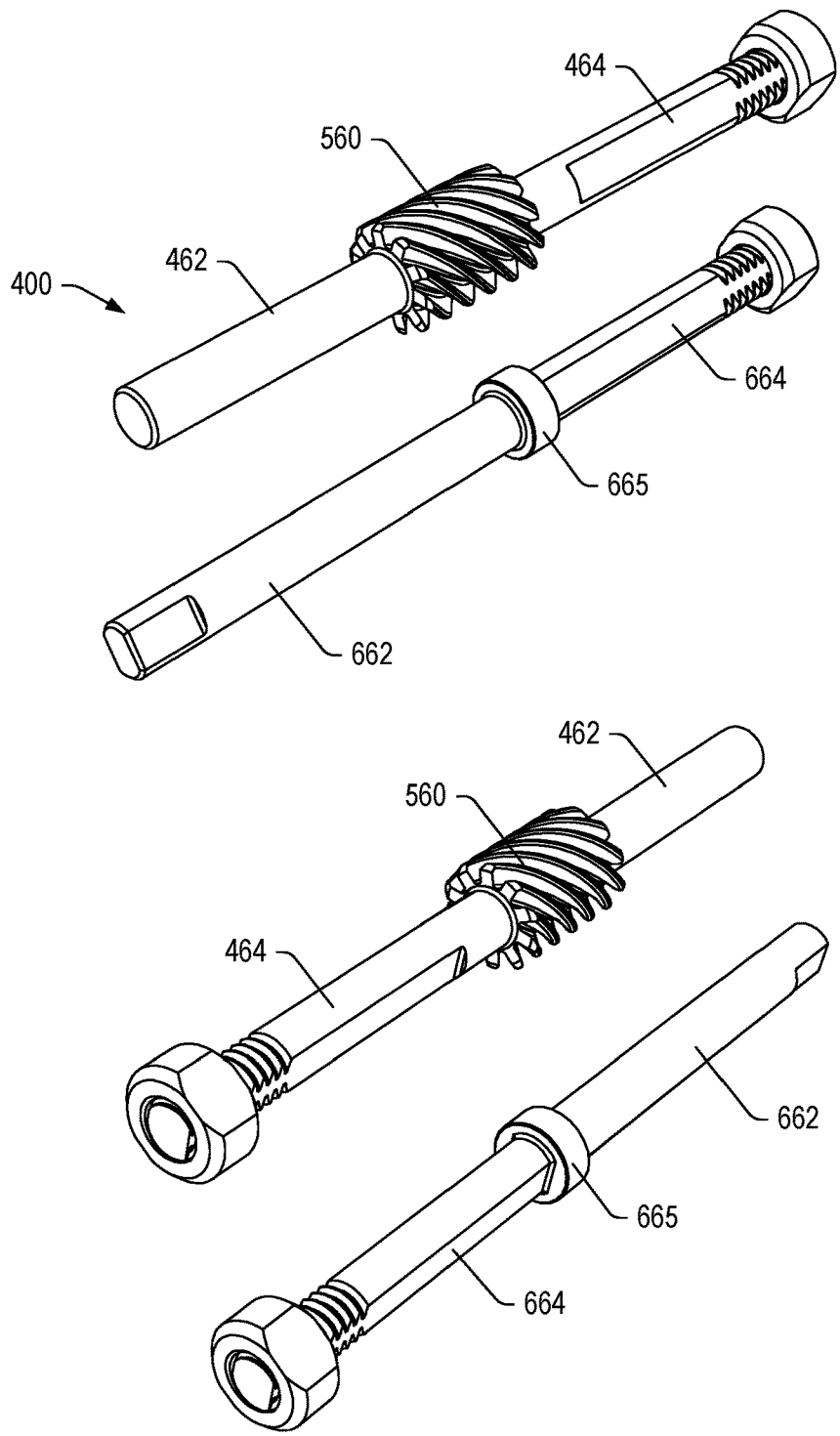
FIG. 7 is a perspective view of an example of a portion of the hinge assembly of FIG. 1.

FIG. 7 shows the axles 462 and 662 where the gear 540 is removed from the axle 662 to show the bushing 665, which can axially locate the gear 540. As an example, the bushing 665 may be formed integrally with the axle 662 and/or may be interference fit or otherwise fixed to the axle 662. As an example, the bushing 665 may be a component that is fit via a key-keyway coupling to the axle 662.

As an example, a device can include a first housing that includes a first thickness; a second housing that includes a second thickness; and a hinge assembly that couples the first and second housings where the hinge assembly includes two hollow axles operatively coupled to the second housing; a coupling mechanism that couples the two hollow axles; two axles, each received by a respective bore of one of the hollow axles, operatively coupled to the first housing; and a coupling mechanism that couples the two axles. In such an example, one of the two hollow axles can include a hollow axle ratio region that includes a first cross-sectional dimension and one of the two axles can include an axle ratio region that includes a second cross-sectional dimension. In such an example, a coupling mechanism can be included that rotatably couples the axle ratio region and the hollow axle ratio region. In such an example, the axle ratio region can include an axle gear, the hollow axle ratio region can include a hollow axle gear and the coupling mechanism that rotatably couples the axle ratio region and the hollow axle ratio region can include an idler gear. As an example, a rotational ratio (e.g., a gear ratio or other rotational ratio) may be defined by a first cross-sectional dimension of a first ratio region and a second cross-sectional dimension of a second ratio region.

As an example, a device can include a first housing is a keyboard housing and a second housing that is a display housing. In such an example, the device can include a closed orientation and a tablet orientation of the keyboard housing and the display housing.

As an example, a coupling mechanism that couples two hollow axles can be or include a gear. As an example, a coupling mechanism that couples two axles can be or include a gear.

As an example, each of two axles can be inner axles, which may be received by outer axles, which can be hollow axles. For example, a hollow axle can include a bore in which at least a portion of another axle may be received. In such an arrangement, the hollow axle may be referred to as an outer axle and the axle received at least in part by a bore of the hollow axle may be referred to as an inner axle. In such an example, the outer axle and the inner axle may be substantially concentrically arranged (e.g., positioned). In such an example, a clearance can exist between an outer surface of the inner axle and an inner surface of the outer axle such that contact is not made between the surfaces. In such an example, the inner axle may rotate in a rotational direction that is opposite that of the outer axle (e.g., and vice versa). As an example, a coupling mechanism may couple two outer axles to rotate in the same rotational direction, a coupling mechanism may couple two inner axles to rotate in the same rotational direction and/or a coupling mechanism may couple an inner axle and an outer axle that are not concentrically positioned where such a coupling mechanism allows for rotation of the inner axle and the outer axle in opposite rotational directions. For example, consider the helical gears 540 (e.g., an outer axle gear), the helical gear 560 (e.g., an inner axle gear) and the gear 570 (e.g., a coupling mechanism) allowing for rotation of the helical gear 540 in a rotational direction while allowing for rotation of the helical gear 560 in an opposite rotational direction where the gear 570 causes such rotation to be coupled.

As mentioned, a coupling mechanism (e.g., at least one coupling mechanisms) can be or include a belt. As an example, such a belt may be a chain belt (e.g., a chain link belt), a pulley-type of belt, etc. As an example, a belt may be a band that is disposed about two hollow axles (e.g., two outer axles) or two axles (e.g., two inner axles). As an example, a belt may cause two hollow axles or two axles to rotate in unison in the same rotational direction.

As an example, each of two hollow axles can include a gear and a coupling mechanism that couples the two hollow axles be or include a gear that meshes with the gears of the two hollow axles. In such an example, the hollow axles may be outer axles that receive inner axles (e.g., an outer axle may receive an inner axle).

As an example, each of the two axles can include a gear and a coupling mechanism that couples the two axles can be or include a gear that meshes with the gears of the two axles. In such an example, the axles may be inner axles that are received by outer axles (e.g., an inner axle may be received an outer axle). As an example, at least one of two axles can include a key where at least one of two gears can include a matching keyway such that a key-keyway coupling is made between an axle and a gear.

As an example, a device can include a processor; memory accessible to the processor; a keyboard housing that includes a first thickness and a keyboard operatively coupled to the processor; a display housing that includes a second thickness and a display operatively coupled to the processor; and a hinge assembly that couples the keyboard housing and the display housing where the hinge assembly includes two hollow axles operatively coupled to the display housing; a coupling mechanism that couples the two hollow axles; two axles, each received by a respective bore of one of the hollow axles, operatively coupled to the keyboard housing; and a coupling mechanism that couples the two axles. In such an example, the two hollow axles may be outer axles and the two axles may be inner axles in that an inner axle is received at least in part by a bore of an outer axle.

As an example, a device can include coupling mechanisms that include one or more gears and/or one or more belts. As an example, a belt may be a chain belt.

As an example, a device can include a closed orientation and a tablet orientation.

As an example, a device can include a hinge assembly that includes an idler gear that includes an axis of rotation that is perpendicular to a plane defined by two axles (e.g., and/or two hollow axles) where the idler gear rotatably couples one of the hollow axles and one of the axles. In such an example, the idler gear can be a helical gear and the one of the hollow axles can include a helical gear and the one of the axles can include a helical gear. In such an example, a gear ratio may be defined, which may optionally differ from unity. As an example, a hollow axle (e.g., an outer axle) may include a helical gear with a number of teeth where the helical gear can rotate about a first axis, an axle (e.g., an inner axle) may include a helical gear with a number of teeth where the helical gear can rotate about a second axis and an idler gear may be a helical gear with a number of teeth that rotatably couples rotation of the hollow axle about the first axis and the axle about the second axis where the first axis and the second axis are displaced from one another by a distance and where the first axis and the second axis are substantially parallel to one another. As an example, a gear ratio may be defined by a number of teeth of one gear and a number of teeth of another gear. In the foregoing example, a gear ratio may determine how many degrees one of the hollow axle and the axle rotates responsive to a number of degrees of rotation of one of the axle and the hollow axle. In such an example, where a gear ratio differs from unity, the number of degrees of rotation of the hollow axle and the axle can differ from unity. As an example, a gear ratio may be selected based at least in part on a thickness or thicknesses of one or more housings that are coupled at least in part by a hinge assembly that includes gears that define the gear ratio.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
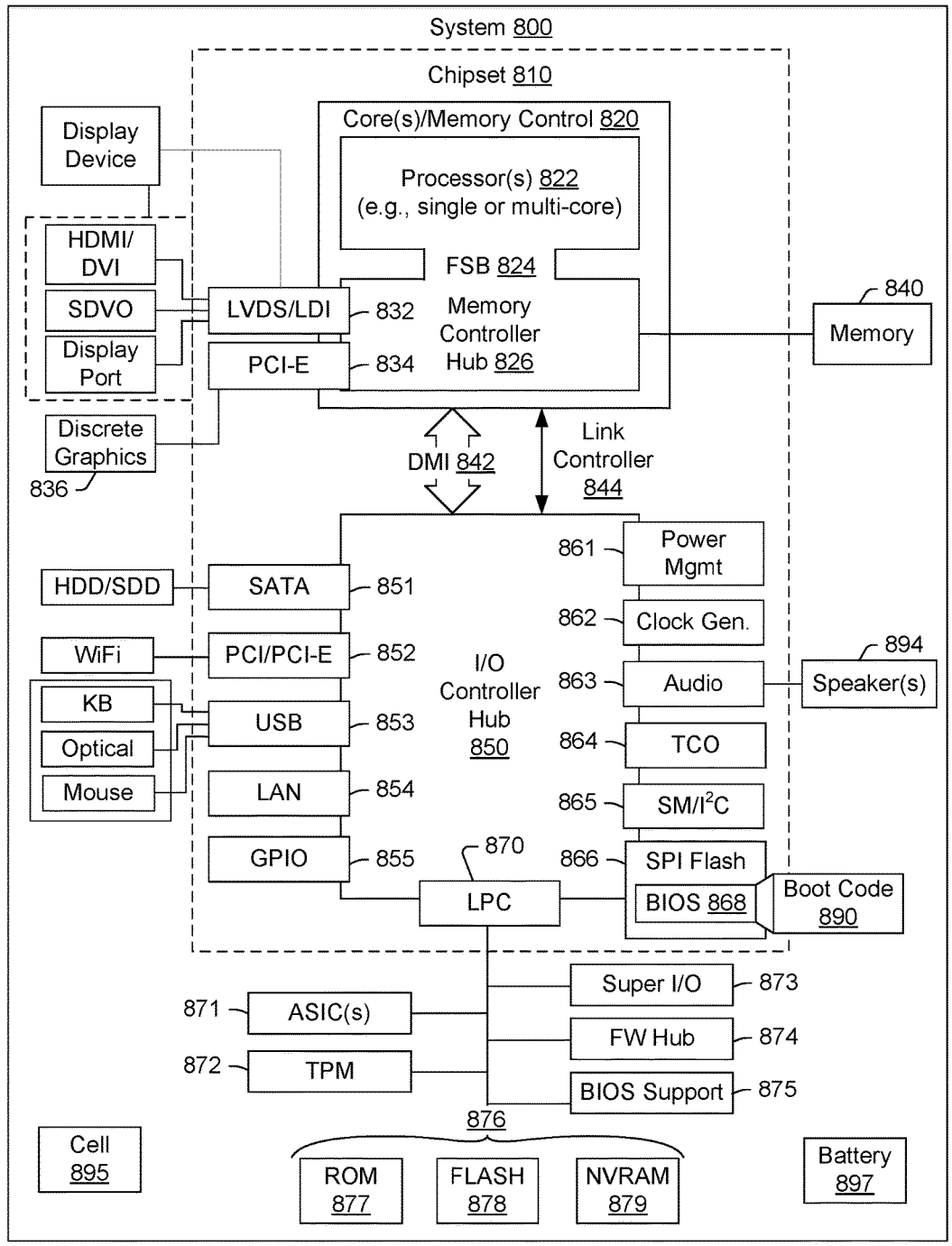
FIG. 8 is a diagram of an example of circuitry of a system, a device, etc.

While various examples of circuits or circuitry have been discussed, FIG. 8 depicts a block diagram of an illustrative computer system 800. The system 800 may be, as an example, a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a system such as a computing system or computing device as in FIG. 1 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
    a first housing that comprises a first thickness;
    a second housing that comprises a second thickness; and
    a hinge assembly that couples the first and second housings wherein the hinge assembly comprises
        two hollow axles operatively coupled to the second housing for movement therewith, wherein the two hollow axles are rotatably coupled to rotate in a common direction via a coupling mechanism that rotatably couples the two hollow axles; and
        two axles, each received by a respective bore of one of the hollow axles, operatively coupled to the first housing for movement therewith, wherein the two axles are rotatably coupled to rotate in a common direction via a coupling mechanism that rotatably couples the two axles.

2. The device of claim 1 wherein one of the two hollow axles comprises a hollow axle ratio region that comprises a first cross-sectional dimension and wherein one of the two axles comprises an axle ratio region that comprises a second cross-sectional dimension and comprising a coupling mechanism that rotatably couples the axle ratio region and the hollow axle ratio region.

3. The device of claim 2 wherein the axle ratio region comprises an axle gear, wherein the hollow axle ratio region comprises a hollow axle gear and wherein the coupling mechanism that rotatably couples the axle ratio region and the hollow axle ratio region comprises an idler gear.

4. The device of claim 2 comprising a rotational ratio defined by the first cross-sectional dimension of the first ratio region and the second cross-sectional dimension of the second ratio region.

5. The device of claim 1 wherein the first thickness exceeds the second thickness.

6. The device of claim 1 wherein the second housing comprises a display housing.

7. The device of claim 1 wherein the first housing comprises a keyboard housing.

8. The device of claim 1 wherein the first housing comprises a keyboard housing and wherein the second housing comprises a display housing and comprising a closed orientation and a tablet orientation of the keyboard housing and the display housing.

9. The device of claim 1 wherein the coupling mechanism that rotatably couples the two hollow axles comprises a gear.

10. The device of claim 1 wherein the coupling mechanism that rotatably couples the two axles comprises a gear.

11. The device of claim 1 wherein at least one of the coupling mechanisms comprises a belt.

12. The device of claim 1 wherein each of the two hollow axles comprises a gear and wherein the coupling mechanism that rotatably couples the two hollow axles comprises a gear that meshes with the gears of the two hollow axles.

13. The device of claim 1 wherein each of the two axles comprises a gear and wherein the coupling mechanism that rotatably couples the two axles comprises a gear that meshes with the gears of the two axles.

14. The device of claim 13 wherein at least one of the two axles comprises a key and wherein at least one of the two gears comprises a matching keyway.

15. A device comprising:
    a processor;
    memory accessible to the processor;
    a keyboard housing that comprises a first thickness and a keyboard operatively coupled to the processor;
    a display housing that comprises a second thickness and a display operatively coupled to the processor; and
    a hinge assembly that couples the keyboard housing and the display housing wherein the hinge assembly comprises
        two hollow axles operatively coupled to the second housing for movement therewith, wherein the two hollow axles are rotatably coupled to rotate in a common direction via a coupling mechanism that rotatably couples the two hollow axles; and
        two axles, each received by a respective bore of one of the hollow axles, operatively coupled to the first housing for movement therewith, wherein the two axles are rotatably coupled to rotate in a common direction via a coupling mechanism that rotatably couples the two axles.

16. The device of claim 15 wherein each of the coupling mechanisms comprises a gear.

17. The device of claim 15 wherein each of the coupling mechanisms comprises a belt.

18. The device of claim 15 wherein each of the coupling mechanisms comprises a chain link belt.

19. The device of claim 15 comprising a closed orientation and a tablet orientation.

20. The device of claim 15 comprising an idler gear that comprises an axis of rotation that is perpendicular to a plane defined by the two axles and that rotatably couples one of the hollow axles and one of the axles.

* * * * *